May 19, 1936. W. H. HUNGERFORD 2,040,996
BAKING PAN
Filed March 7, 1934
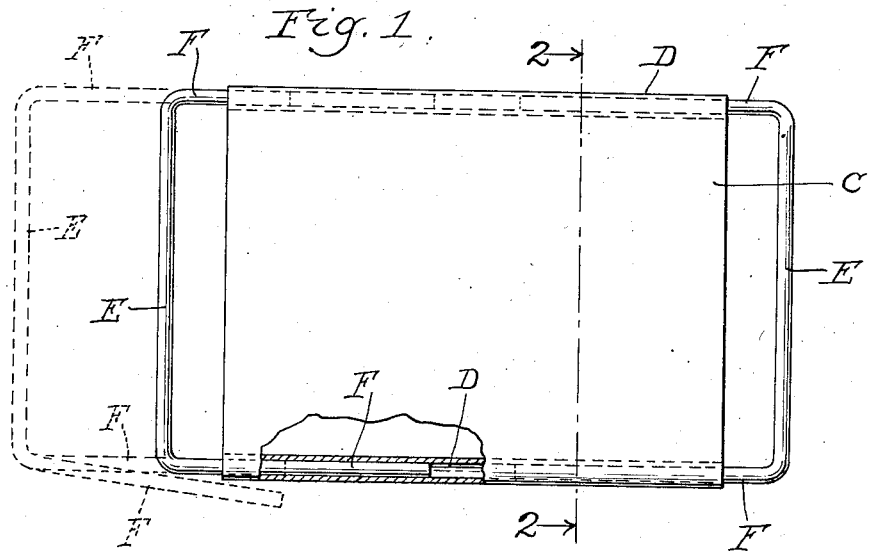
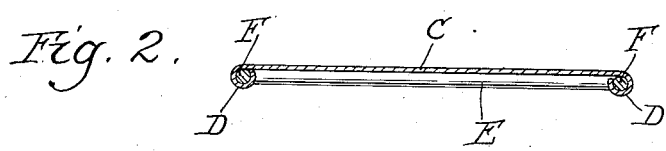
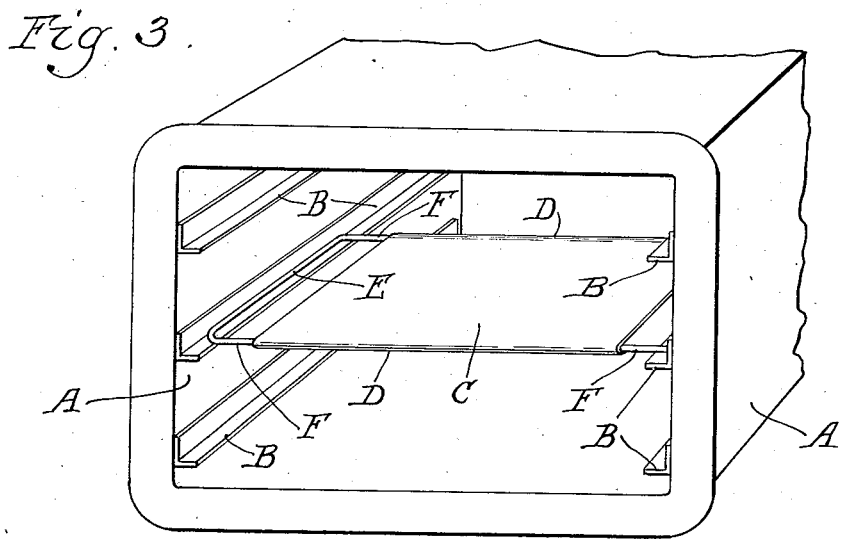
Inventor
Warren H. Hungerford
by Parker & Carter
Attorneys Patented May 19, 1936

2,040,996

UNITED STATES PATENT OFFICE 2,040,996

BAKING PAN

Warren H. Hungerford, Chicago, Ill.

Application March 7, 1934, Serial No. 714,375

1 Claim. (Cl. 53—6)

My invention relates to an improvement in baking pans and has for one purpose to provide a readily adjustable pan or cookie sheet for home baking. Another purpose is to make such a pan adjustable to any size of oven within a considerable range. Another object is the provision of an improved reinforced cookie pan or plate. Other objects will appear from time to time in the course of the specification and claim.

I illustrate my invention more or less diagrammatically in the accompanying drawing, wherein—

Figure 1 is a plan view;

Figure 2 is a section on the line 2—2 of Figure 1; and

Figure 3 is a perspective illustrating the pan in position in an oven.

Like parts are indicated by like parts throughout the specification and drawing.

Referring to the drawing A generally indicates side walls of an oven, which walls are provided with channels or other suitable supporting members B. C indicates generally the cookie sheet or pan which is shown as in the form of a single sheet of metal having its opposite edges rolled as at D. This rolling performs a dual function. In the first place, it provides a tube along each side of the sheet C in which the later described supporting members are adjustably positioned. It also serves as a reinforcement or support for each edge of the member C.

EE indicate support brackets each having at each end angular portions F adapted to extend into the tubes formed by the rolling D of the edges of the plate C. The members F are slightly sprung to provide a slight spring tension. That is to say that unless they were constrained by the members or tubes D, they would spring somewhat out of parallel. This gives a slight locking or holding effect so that each member E will maintain the desired position in relation to the plate C once it has been positively moved by the user into desired adjustment. The angular or rod portions F, therefore, spring hold the member E in the desired adjustment.

It will be realized that whereas I have described and shown a practical and operative device, nevertheless many changes might be made in the size, shape, number and disposition of parts without departing from the spirit of my invention. I therefore wish my description and drawing to be taken as in a broad sense illustrative and diagrammatic rather than as limiting me to my specific showing.

The use and operation of my invention are as follows:

It is frequently desirable to bake small objects such as cookies in an oven, objects which do not need any restrained side pan walls. Ovens are prevailingly made having compartments with side supports, such as the channels B into which rosters or the like can be slidably inserted. I provide an adjustable cookie pan or plate which, by adjusting the position of one or both of the members E, may be adjusted to a wide variety of sizes and shapes of ovens.

I claim:

In a cooking device, a metal sheet having each of two opposite edges rolled to form generally tubular reinforcing members, and a resilient wire support for said sheet, at each end thereof, slidable in relation to the sheet, said wire supports having each an intermediate portion generally parallel with an end of the metal sheet, and two prong portions adapted to penetrate the apertures of the tubular reinforcing members, said penetrating prongs being sprung somewhat out of parallelism with the reinforcing members, and being adapted thereby to provide a spring grip between said tubular members and the supports, the intermediate portion of said supports being generally parallel, and additional parallel supporting abutments adapted slidably to receive said parallel portions of said supports.

WARREN H. HUNGERFORD.